(12) United States Patent
Peterson

(10) Patent No.: US 8,839,927 B2
(45) Date of Patent: Sep. 23, 2014

(54) PAWL STOP FOR USE IN RATCHET AND PAWL STYLE CLUTCH

(75) Inventor: Jody A. Peterson, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 707 days.

(21) Appl. No.: 12/940,093

(22) Filed: Nov. 5, 2010

(65) Prior Publication Data

US 2012/0111686 A1     May 10, 2012

(51) Int. Cl.
  *F16D 41/12*     (2006.01)
  *F16D 43/02*     (2006.01)

(52) U.S. Cl.
  USPC .............. 192/46; 192/42; 74/7 C; 74/576

(58) Field of Classification Search
  USPC ............ 192/42, 64, 79; 74/576, 577 R, 577 S
  See application file for complete search history.

(56) References Cited

U.S. PATENT DOCUMENTS

| | | | |
|---|---|---|---|
| 414,545 A * | 11/1889 | Jones | ............................ 74/577 R |
| 3,727,733 A | 4/1973 | Mrazek | |
| 4,187,728 A * | 2/1980 | Mazzorana | ...................... 192/46 |
| 4,282,771 A | 8/1981 | Grube | |
| 4,386,744 A | 6/1983 | Higbee | |
| 4,834,225 A | 5/1989 | Klopfenstein et al. | |
| 4,890,979 A | 1/1990 | Ames et al. | |
| 4,899,534 A | 2/1990 | Sorenson | |
| 4,914,906 A | 4/1990 | Burch | |
| 4,926,631 A | 5/1990 | Sorenson | |
| 5,205,386 A | 4/1993 | Goodman et al. | |
| 5,246,094 A | 9/1993 | Army et al. | |
| 5,257,685 A | 11/1993 | Tichiaz et al. | |
| 6,125,979 A | 10/2000 | Costin et al. | |
| 6,338,403 B1 | 1/2002 | Costin et al. | |
| 6,959,680 B2 * | 11/2005 | Hashiba | ................... 123/185.14 |
| 7,341,135 B2 | 3/2008 | Jin | |
| 2012/0111687 A1 * | 5/2012 | Peterson | .......................... 192/46 |

* cited by examiner

*Primary Examiner* — Jacob S Scott
(74) *Attorney, Agent, or Firm* — Carlson, Gaskey & Olds, P.C.

(57) ABSTRACT

A pawl and ratchet assembly including a rotatable pawl, a spring, a ratchet, and a member. The rotatable pawl is configured to rotate about a fixed axis during operation. The spring urges the pawl towards the ratchet. The member interferes with the travel of the pawl during operation. The member is non-magnetized.

5 Claims, 3 Drawing Sheets

PAWL STOP FOR USE IN RATCHET AND PAWL STYLE CLUTCH

BACKGROUND OF THE INVENTION

The present invention relates generally to pawl and ratchet clutches for use on unidirectional drive systems, and more specifically to a pawl holdback means for limiting pawl travel. The pawl and ratchet clutch of the present invention is particularly suitable for use in starters for starting engines, such as aircraft turbine engines.

Pawl and ratchet clutches are often utilized in unidirectional drive systems for transmitting drive torque from a drive shaft to a driven shaft. For example, starters of the type commonly used to start engines, in particular the turbine engines of modern gas turbine powered aircraft often employ a pawl and ratchet type clutch which functions to transmit rotational drive torque from a drive shaft of the starter to drive the engine being started to starting speed. One type of starter often employing a pawl and ratchet clutch is the pneumatic starter, also known as an air turbine starter, such as disclosed, for example, in U.S. Pat. Nos. 3,727,733; 4,899,534; 4,914,906; and 4,926,631.

A pawl and ratchet clutch of a type commonly used in such pneumatic starters includes a toothed ratchet member mounted on a central drive shaft and a plurality of pivotal pawls supported from and rotating with a driven output shaft disposed coaxially about the drive shaft. The pawls are operatively disposed at circumferentially spaced intervals about the ratchet member in cooperative relationship therewith. Each pawl is biased to pivot radially inwardly by a leaf spring operatively associated therewith to engage a tooth of the ratchet member thereby coupling the drive shaft in driving relationship to the driven output shaft so long as the pawls remain engaged with the teeth of the ratchet member. The drive shaft is connected, either directly or through suitable reduction gearing as desired, to the shaft of the pneumatic starter turbine, which is powered by extracting energy from a flow of pressurized fluid passed through the turbine of the starter.

To start the turbine engine, the output end of the driven output shaft of the starter is connected, for example by mating splines, to an engine shaft operatively connected to the main engine shaft through a gear box, and pressurized fluid, typically compressed air, is passed through the turbine of the pneumatic starter. As the starter turbine extracts energy from the compressed air passing therethrough, the drive shaft of the starter turbine is rotated to in turn rotatably drive the output shaft of the starter, and consequently the turbine engine shaft connected thereto, through the engagement of the pawls pivotally mounted to the output shaft with the ratchet member mounted to the drive shaft. Typically, the starter is designed to accelerate the engine shaft from zero to a predetermined cut-off speed, typically of about 5000 revolutions per minute, in about one minute or less.

Once engine light-off has occurred and the engine shaft is rotating at the desired cut-off speed, the flow of pressurized air to the starter turbine is terminated, when this happens, torque transfer from the ratchet into the pawl ceases. With the flow of pressurized air to the starter turbine shut-off, the drive shaft of the starter rapidly slows down. Consequently, the ratchet member mounted to the starter drive shaft also rapidly slows down, while the pawls supported from the starter output shaft continue to rotate with the engine of the operating turbine engine at the relatively high cut-off speed. The pawls become disengaged from the ratchet member when the rotational speed of the output shaft exceeds a threshold speed whereat the pawls lift-off of the ratchet member (the lift off speed is a design requirement), that is pivot radially outwardly out of contact with the teeth of the ratchet member, under the influence of the centrifugal forces acting thereon due to the continued rotation of the pawls at the relatively high speed of the engine shaft and remain disengaged from the ratchet member so long as the rotational speed of the engine shaft remains high enough that the centrifugal forces acting on the pawls exceed the opposing moment imposed on the pawls by the force of their associated bias springs.

When the turbine engine is later shut-down, the operating speed of the engine shaft of the turbine engine to which the output shaft of the starter is connected rapidly decreases as the turbine engine spools down. As the starter shaft slows down, the centrifugal force on the pawls consequently decreases and the force of each bias spring progressively pivots its associated pawl radially inwardly again toward the ratchet member until each pawl reengages a ratchet tooth on the non-rotating ratchet member so as to reengage the clutch. The speed at which the reengagement of the pawls with the ratchet member occurs, commonly referred to as the reengagement speed, is less than the pawl lift-off speed by an amount that is a function of the clutch hysteresis.

SUMMARY OF THE INVENTION

According to an example disclosed herein, a pawl and ratchet assembly has a rotatable pawl, a spring for urging the pawl towards the ratchet, and a member for interfering with travel of the pawl such that force of the spring upon the pawl is reduced.

According to a further example disclosed herein, a method for reducing motion of a rotatable pawl in a pawl and ratchet assembly that has a spring urging the pawl towards a ratchet includes mounting a stop on the assembly for interfering with motion of the pawl. This reduces the spring deflection, which reduces the force acting at the contact face, which reduces contact stress.

According to a still further example disclosed herein, an air turbine starter includes a clutch carrier and a pawl and ratchet assembly mounted on the clutch carrier. The pawl and ratchet assembly includes a spring for urging the pawl towards a ratchet and a member for interfering with travel of the pawl during operation of the assembly so that force of the spring upon the pawl is reduced.

These and other features of the present invention can be best understood from the following specification and drawings, the following of which is a brief description.

DETAILED DESCRIPTION OF THE PREFERRED EMBODIMENT

Figure 1:
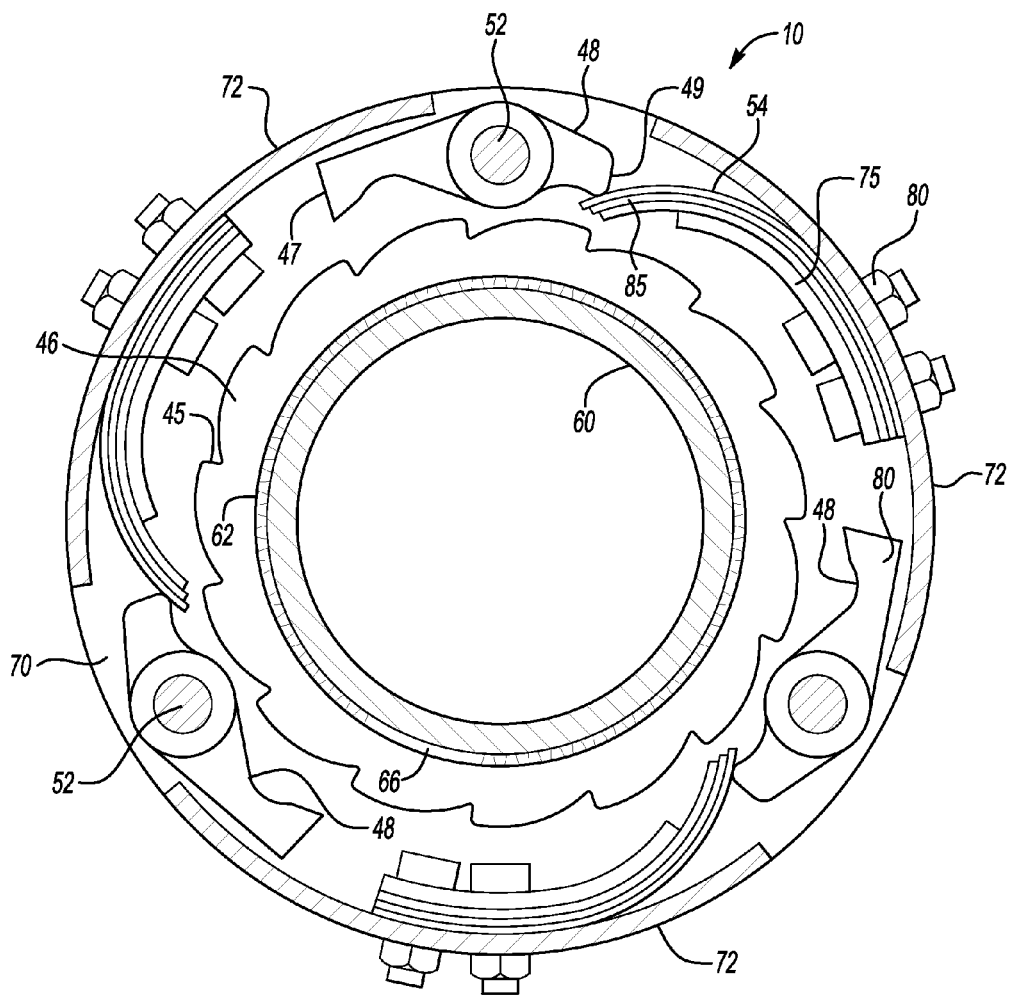
FIG. 1 is a prior art view of a pneumatic starter having a pawl and ratchet assembly.

Referring now to FIG. 1, there is depicted a prior art pneumatic starter 10 of the general type often utilized to start gas turbine engines, such as for example aircraft turbine engines (not shown). The pneumatic starter 10, also known as an air turbine starter, includes a turbine wheel (not shown) which is driven by a compressed gas, most commonly compressed air from an external supply, passing therethrough so as to extract energy from the gas and convert the extracted energy to mechanical energy through a gear train (not shown) in a manner well known in the art. Although the present invention is described herein with reference to an air turbine starter, it is to be understood that the pawl and ratchet assembly of the present invention has application on any unidirectional drive system wherein a pawl and ratchet clutch is utilized to transmit rotation from a driving shaft to a driven shaft.

Extending axially outwardly from the transmission (not shown) is an output shaft 60 which has means, such as for example splines 62, for engaging an engine shaft (not shown) in the gear box of the turbine engine (not shown) on which the starter 10 is utilized to start the turbine engine. The output shaft 60 is rotatably supported on bearing means 66. The aforementioned pawls 48, of which there are typically three, are supported on a clutch carrier 70 of the pneumatic starter 10 that extends radially outward from the output shaft 60. Each of the pawls 48 is pivotally supported on a shaft 52 mounted to and extending axially from the clutch carrier 70 such that the pawls 48 are disposed in cooperation with the ratchet member 46 at equally spaced intervals about the circumference of and in radially spaced relationship from the ratchet member 46.

Additionally, each of the pawls 48 is biased to pivot about its support shaft 52 to rotate the toe end 47 thereof radially inwardly towards the ratchet member 46 under the force of a bias spring 54 mounted to an axial flange portion 72 of the clutch carrier 70. Each bias spring 54 may comprise a leaf spring operatively bearing against the heel end 49 of its associated pawl 48 so as to, in a manner well known in the art, function during operation of the starter 10 to load the toe end 47 of its associated pawl 48 into engagement with the teeth 45 of the ratchet member 46 of the pawl and ratchet clutch to ensure transmission of torque from a ring gear (not shown) to the output shaft 60 until the output shaft 60 has reached a relatively high desired cut-off speed, for example about 5000 rpm, at which the pawls 48 pivot away from the ratchet member 46 under the influence of centrifugal force after disengagement from the teeth 45 of the ratchet member 46 upon slowing down of the ratchet member 46 after termination of the flow of compressed air through the starter turbine (not shown).

When the pawls 48 are engaged with the teeth 45 of the ratchet 46 during operation of the starter 10, the output shaft 60, and the engine shaft of the turbine engine (not shown) connected therewith, are driven in rotation through the engaged pawl 48 and ratchet member 46.

After the shaft of the turbine engine (not shown) engages with the output shaft 60 of the starter 10 reaches the preselected desired engine speed, the flow of compressed air to and through the turbine wheel (not shown) is shut off. As a result, drive power is no longer being delivered to the ratchet member 46. Consequently, the ratchet member 46 slows down and its rotational speed rapidly decreases, while the output shaft 60 of the starter 10 and the pawls 48 mounted thereto continue to rotate at the higher engine speed, thereby causing the pawls 48 to become disengaged from the ratchet member 46 and pivot away from the ratchet member 46. Centrifugal force acting on the pawls 48 overcomes the engagement force provided by spring 54 to cause the pawls 48 to rotate away from and disengage the ratchet member 46. The contact force at the tip of the pawl that results from torque transfer from the ratchet into the pawl is what keeps the pawl in contact with the ratchet during starts. When the air is turned off and torque transfer ceases, the centrifugal force exceeds the spring force and the pawl lifts off the ratchet.

When the turbine engine is later shut down, the starter output shaft 60 begins to slow down and its rotational speed steadily decreases as the turbine engine spools down. As the output shaft 60 coasts down, the centrifugal force acting on the pawls 48 so as to urge the toe ends 47 of the pawls 48 radially outwardly steadily decreases and the toe end 47 of each pawl 48 begins to pivot radially inwardly toward the ratchet member 46 under the bias force applied by the springs 54 on the heel 49 of the pawls 48 until the toe ends 47 of the pawls 48 re-engage with the teeth 45 of the ratchet member 46.

A spring clamp 75 is attached by bolts 80 to the axial flange portion 72 of the clutch carrier 70 to hold the spring 54.

Existing ratchet and pawl clutch designs experience spring failures and pawl heel wear. A spring fracture and pawl heel wear may alter the performance of the unit in a negative manner. A source of spring fractures and pawl heel wear may include contact forces experienced at the spring tip 85 and pawl heel 49 during over-running conditions. During over-running conditions centrifugal force rotates the pawl 48 radially outward which increases spring deflection. The force resulting from the deflected spring is non-linear and subsequently a greater deflection results in a significantly greater force. The greater force accelerates wear between the pawl heel 49 and the spring tip 85.

Figure 3:
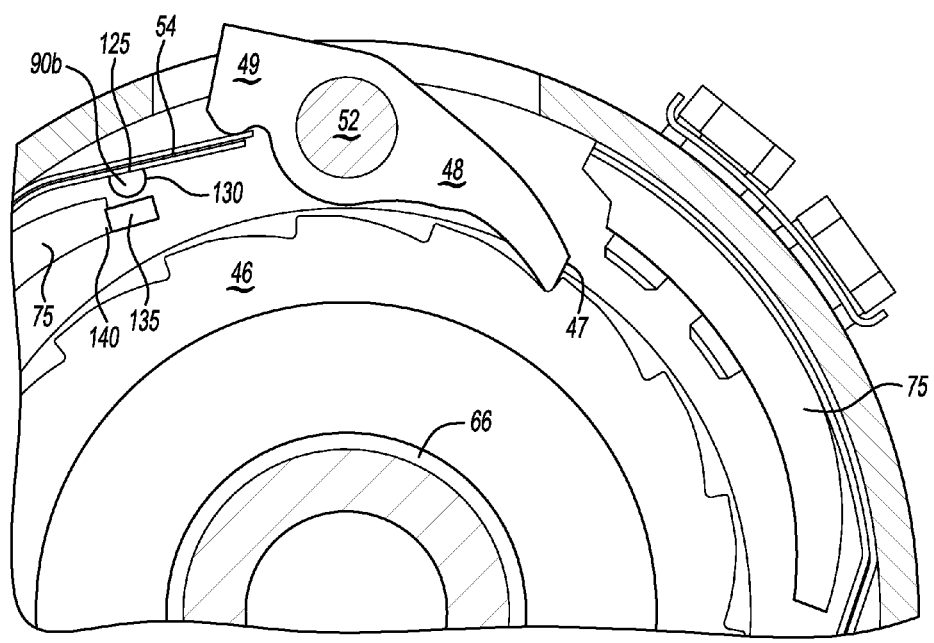
FIG. 3 is a sectional side view of the pawl and ratchet assembly of the pneumatic starter of FIG. 1 including a second embodiment of a stop.
Figure 4:
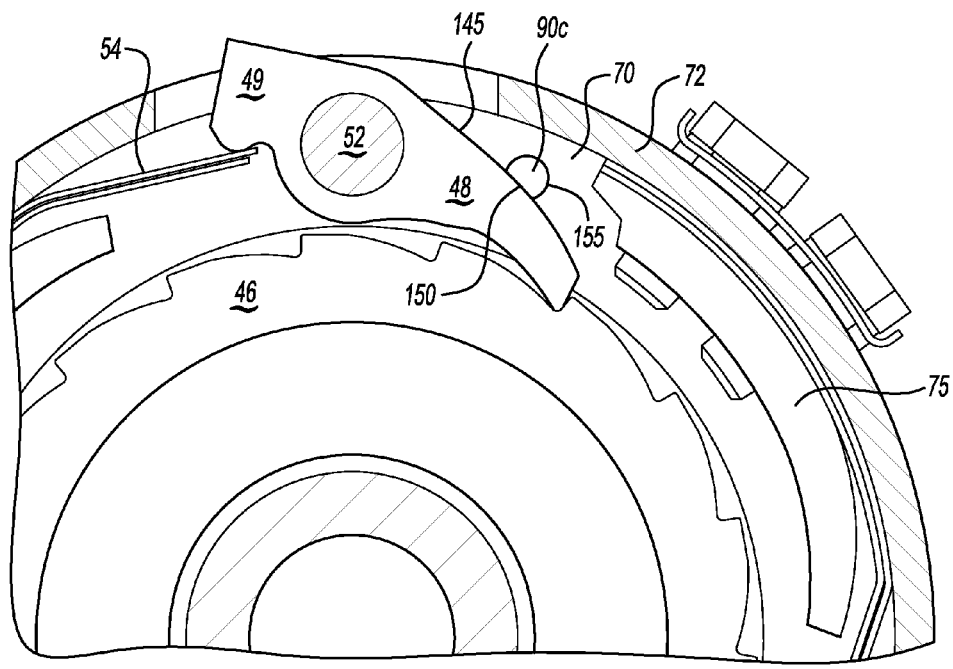
FIG. 4 is a sectional side view of the pawl and ratchet assembly of the pneumatic starter of FIG. 1 including a third embodiment of a stop.
Figure 5:
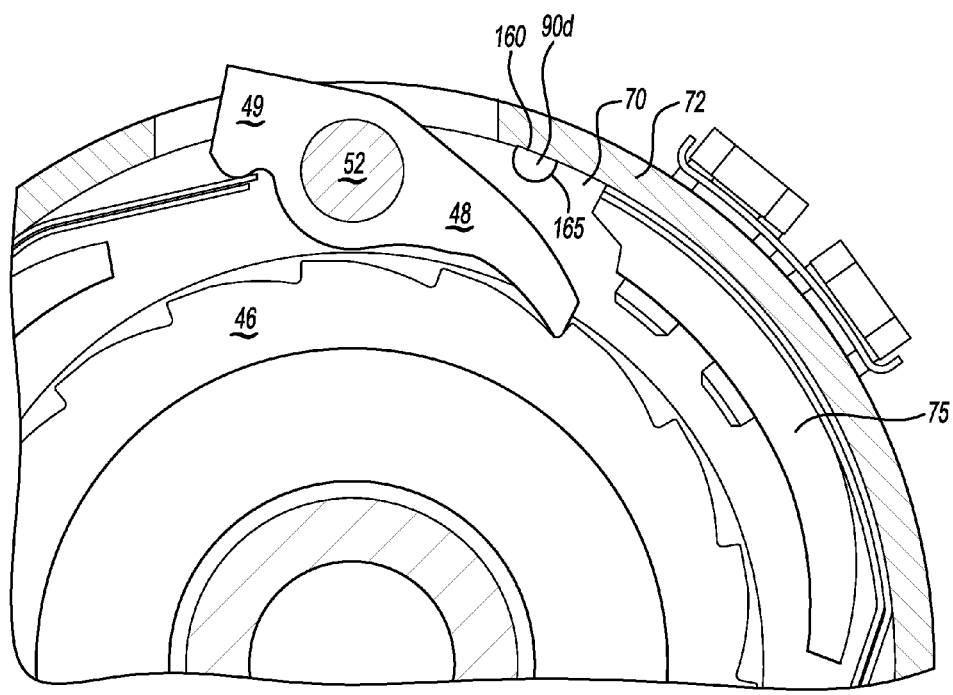
FIG. 5 is a sectional side view of the pawl and ratchet assembly of the pneumatic starter of FIG. 1 including a fourth embodiment of a stop.

Referring now to FIGS. 2-5, a pawl stop member 90a-d may be included in the ratchet and pawl clutch assembly and can be located on several components, including to but not limited to the spring clamp 75 (FIG. 2), the bias spring 54 (FIG. 3), the pawl 48 (FIG. 4), or the axial flange portion 72 (FIG. 5). The pawl stop 90a-d limits the radial rotation of the pawl 48 about the shaft 52 to decrease the spring deflection to minimize damage to the spring 54 and to the pawl heel 49. The pawl stop 90a-d may be constructed of a steel or other metal that is added for its longevity or an elastomeric or the like to damp vibrations of the pawl 48 as the clutch carrier 70 rotates. The pawl stops 90a-d, if metal, are attached to their respective places by welding or gluing or the like, and, if elastomeric, by gluing or the like.

Figure 2:
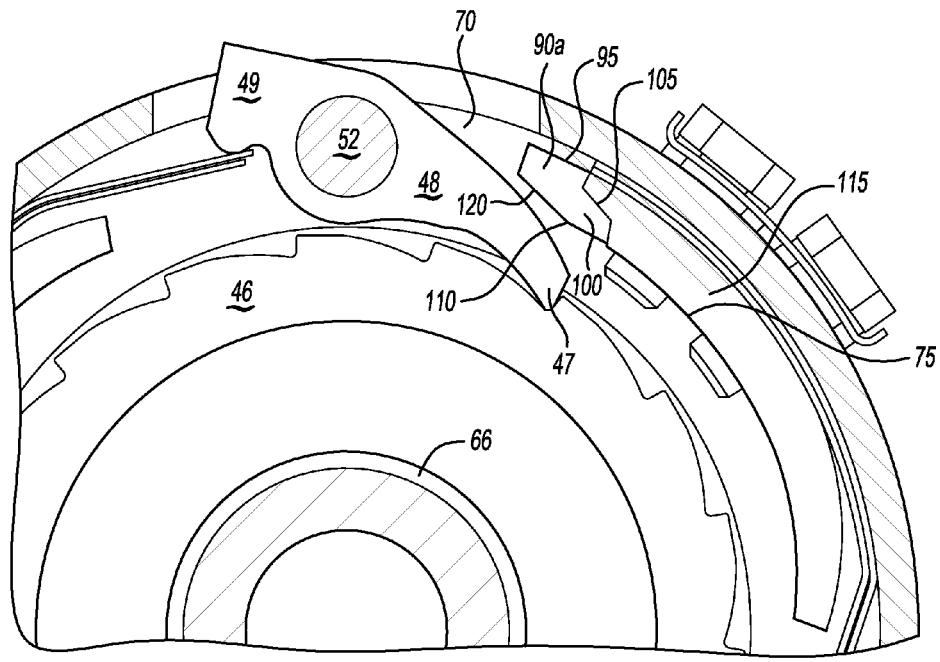
FIG. 2 is a sectional side view of the pawl and ratchet assembly of the pneumatic starter of FIG. 1 including a first embodiment of a stop.

Referring now to FIG. 2, pawl stop 90a is added to spring clamp 75 to minimize the force provided by the spring 54. The pawl stop 90a may have a flat back 95, a notch 100 for receiving an angled rear portion 105 of the spring clamp 75, an inner portion 110 conforming to and in register with an inner surface 115 of the spring clamp 75, and an angled portion 120 angling away from said inner portion 110 for contacting the pawl 48. Rotation of the pawl 48 away from the ratchet 46 is minimized as the pawl stop 90a is contacted by the pawl 48.

Referring now to FIG. 3, pawl stop 90b is added to the spring 54 to minimize the force provided by the spring 54. The pawl stop 90b may have a flat back 125 and a semicircular body 130. The pawl stop 90b engages an extension 135 attaching to a rear end 140 of the spring clamp 75. Rotation of the pawl 48 away from the ratchet 46 causes the spring 54 to react towards the spring clamp 75. Motion of the spring 54 is limited by contact of the pawl stop 90b with the extension 135. Alternatively, the pawl stop 90b may attach to the extension 135 as opposed to the spring 54 to achieve a similar result.

Referring now to FIG. 4, pawl stop 90c is added to the pawl 48 on a back surface 145 thereof to reduce the force provided by the spring 54. The pawl stop 90c may have a relatively flat back 150 and a semicircular body 155, where the relatively flat back 150 is configured to interface with an upper surface of the pawl 48. Rotation of the pawl 48 away from the ratchet 46 is minimized as the pawl stop 90c contacts the axial flange portion 72 of the clutch carrier 70 which is in registration with the pawl 48 to allow contact therebetween.

Referring now to FIG. 5, pawl stop 90d is added to the axial flange portion 72 of the clutch carrier 70 to minimize the force provided by the spring 54. The pawl stop 90d may have a curved back 160 and a semicircular body 165, where the curved back 160 is aligned with curvature of the axial flange portion 72 of the clutch carrier 70. Rotation of the pawl 48 away from the ratchet 46 is minimized as the pawl stop 90d is contacted by the rotating pawl 48.

Although the invention has been shown and described with respect to a best mode embodiment exemplary thereof, it should be understood by those skilled in the art that various modifications, changes, omissions and additions in the form and detail thereof may be made without departing from the spirit and scope of the invention. For example, although bias spring 54 of FIGS. 2-5 is depicted as a leaf spring, the pawl stops 90a-90d may be used in conjunction with pawl 48 and any spring means suitably configured and disposed for biasing the toe portion 47 of the pawl 48 radially inwardly toward the ratchet member 46. Additionally, pawl stop backs 125, 150, and 160 can be shaped to align with surfaces to which they are coupled.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A pawl and ratchet assembly, said assembly comprising:
a rotatable pawl configured to rotate about a fixed axis;
a spring for urging said pawl towards a ratchet;
a member for interfering with travel of said pawl during operation of said assembly wherein said member is non-magnetized, disposed upon said spring, includes a back portion for attaching to said spring, and a semicircular body; and
a clamp for securing an end of said spring, said clamp having an extension for engaging said member to limit motion of said spring and said pawl as said pawl rotates.

2. The assembly of claim 1 wherein said back portion is flat.

3. The assembly of claim 1 further comprising a flange upon which said spring is clamped and which is in registration with said pawl.

4. The assembly of claim 1, wherein said member is made of an elastomeric material.

5. The assembly of claim 1, wherein said pawl is configured to move said member towards said extension when said pawl rotates under centrifugal forces.

* * * * *